Nov. 10, 1964  E. T. TRAINOR  3,156,813
BATTERY WARMER
Filed Oct. 15, 1962
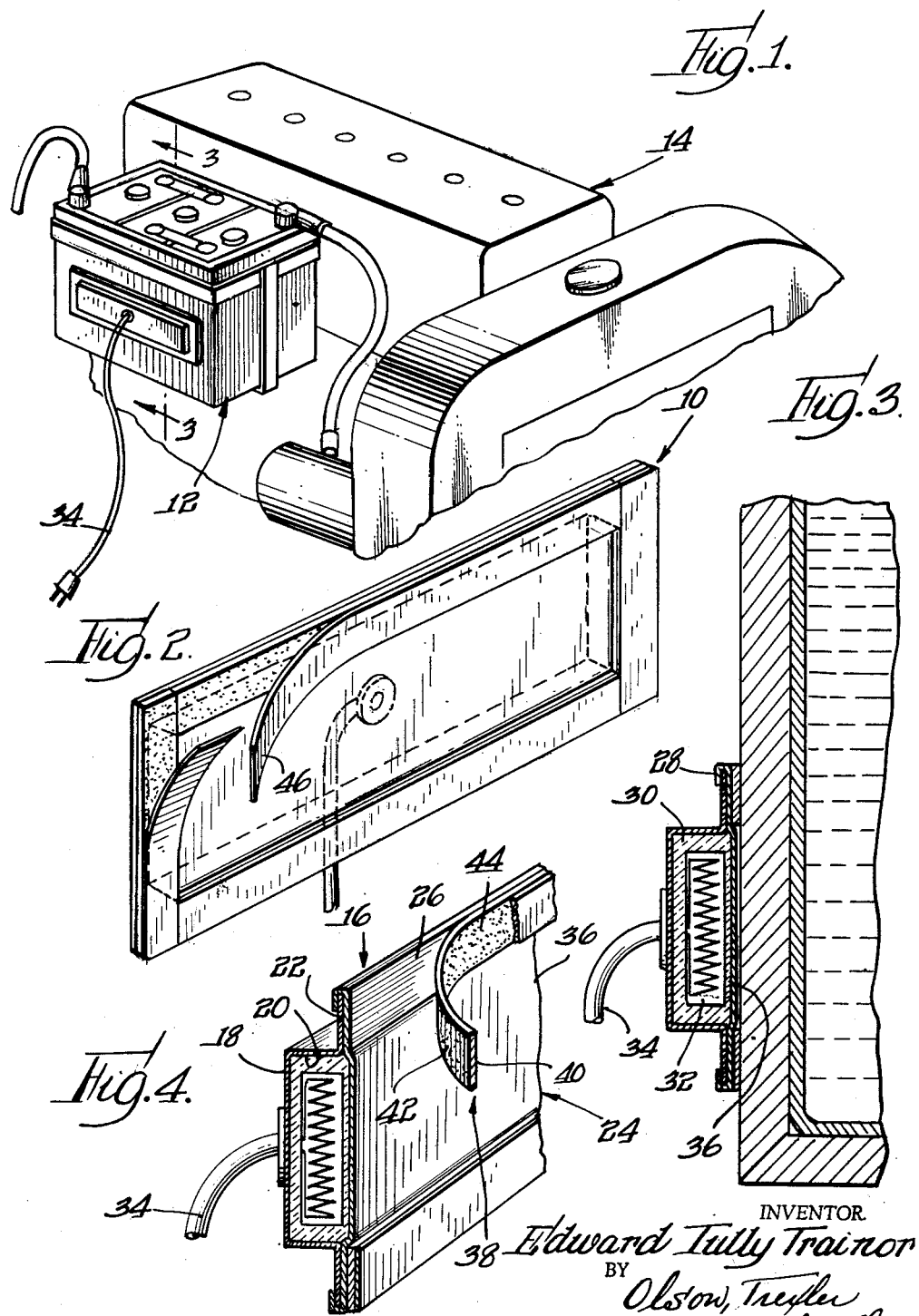
INVENTOR.
Edward Tully Trainor
BY
Olson, Trexler
Wolters & Bushnell attys.

United States Patent Office 3,156,813
Patented Nov. 10, 1964

3,156,813
BATTERY WARMER
Edward Tully Trainor, Chicago, Ill., assignor to Milesmaster Inc. of America, Chicago, Ill., a corporation of Illinois
Filed Oct. 15, 1962, Ser. No. 230,655
4 Claims. (Cl. 219—526)

The present invention relates to a novel heating device, and more specifically to a novel device adapted to be mounted on an article to be heated.

While various uses for heating devices constructed in accordance with the present invention may suggest themselves, the device is particularly suitable for maintaining a storage battery mounted in a vehicle or any other location at a desired temperature. As is well known, the efficiency of a battery falls off rapidly as temperature decreases.

For example, a battery which is capable of delivering one hundred percent of its power at a temperature of 80° F. may only deliver about forty percent of its power at 0° F. At the same time, the power required to turn and start a vehicle engine sharply increases with a decrease in temperature. The combination of the decrease in battery power and the increase in power required to start an engine creates substantial starting difficulties at the lower temperatures. Many of these difficulties can be overcome by maintaining the battery at or near a temperature at which it will deliver its maximum power.

It is an important object of the present invention to provide a novel heating device capable of maintaining a battery or any other desired article at an elevated temperature.

Another important object of the present invention is to provide a novel heating device which may be quickly and easily mounted in association with a vehicle battery or the like without requiring separate fastening devices or adapters and without requiring removal of the battery.

Still another important object of the present invention is to provide a novel heating device which is of simple, efficient and economical construction.

A further object of the present invention is to provide a novel heating device adapted to be mounted in association with a particular portion of a battery for heating the battery in a manner for promoting circulation of the fluid within the battery and thereby obtaining more uniform heating of the battery.

Other objects and advantages of the present invention will become apparent from the following description and accompanying drawings wherein:

FIG. 1 is a fragmentary perspective view showing a heating device incorporating features of the present invention mounted in association with a vehicle battery;

FIG. 2 is an enlarged perspective view showing a heating device constructed in accordance with the present invention prior to assembly with a battery;

FIG. 3 is an enlarged fragmentary sectional view taken along line 3—3 in FIG. 1; and FIG. 4 is a fragmentary perspective view showing the heating device in a partially assembled condition.

Referring now more specifically to the drawings wherein like parts are designated by the same numerals throughout the various figures, a heating device 10 incorporating features of the present invention is shown, which heating device is adapted to be mounted in association with various articles such as a battery 12 installed in a vehicle 14. It will be appreciated that in many parts of the country, vehicles which are parked out of doors during the winter are subjected to intense cold. The heating device 10 is adapted to be connected with a suitable source of electrical power such as an extension cord, not shown, for maintaining the battery 12 at a desired elevated temperature.

As shown in FIGS. 1 and 2, the heating device 10 comprises an elongated body or shell 16 having a length sufficient to traverse at least a portion of all of the cells in the battery 12. The device is adapted to be mounted against a side of the battery in the manner described in detail below, and shown best in FIG. 3. This causes a substantially localized heating of a side wall portion of all the cells of the battery. The battery liquid adjacent to and in contact with the heated wall portion of the battery is heated and tends to rise whereby convection currents are created which promote uniform heating of the entire battery.

The housing or shell 16 comprises a first member 18 providing an elongated chamber 20 surrounded by a laterally extending substantially flat marginal flange 22. A plate member 24 traverses and covers the chamber 20 and is provided with a peripheral rectangular marginal portion 26 abutting and conforming to the rectangular flange portion 22 of the member 18. The marginal portion 26 has an edge portion 28 formed and hooked around the flange 22 for securing the body members 18 and 24 in assembled relation.

The walls of the chamber 20 provided by the member 18 are lined by heat and electrical insulating material 30 as shown in FIGS. 3 and 4. An electrical resistance heating element 32 is mounted within and supported by the insulation 30. An electrical cord 34 is connected with the heating element 32 and extends for connection with any suitable source of power, not shown. It will be appreciated that the cord 34 may be extended through the grill of a vehicle, or if desired, the cord may be secured at any desired location beneath the hood of a vehicle.

A relatively thin member 36 of electrical insulating material may be provided for insulating the heating element from the plate member 24 in a manner which does not unduly retard the transfer of heat through the plate member 24 and to the battery. It will be noted that a central panel 36 of the plate member 34 within the marginal portion 26 is embossed or offset from the marginal portion so as to be positioned in closely spaced relation with respect to the surface of the battery as shown in FIG. 3 for promoting the transfer of heat between the heating device and the battery.

In accordance with a feature of the present invention, the device 10 is provided with means for quickly and securely mounting the device against the side of the battery 12 without the aid of screws, clips or similar fasteners, and without requiring removal of the battery. More specifically, a relatively thick tape 38 is applied to the marginal portion 26 of the housing, preferably substantially entirely around the periphery of the housing.

The tape 38 has a relatively thick central body portion 40 formed of a soft resilient material such as polyurethane which is resistant to the temperature extremes, dirt and the like encountered beneath the hood of a vehicle. A resilient pressure sensitive adhesive 42 is applied to one side of the central body portion 40 for securing the tape to the peripheral portion 26 of the housing 16. A similar resilient pressure sensitive adhesive 44 is applied to the outer surface of the body 40 for securing the device against the side wall of the battery. Initially, the outer adhesive layer 44 of the tape is covered with strips of paper 46.

In order to mount the heating device on the battery, it is merely necessary to assure the cleanliness of the side of the battery, and then pull the paper strips 46 from the tape and press the heating device against the side of the battery. It is to be noted that the thickness of the tape 38 is substantial and is sufficient to maintain the central portion 36 of the plate member 24 out of direct contact with the side of the battery. Thus the tape 38 not only provides means for securing the heating device to the battery, but also provides a resilient mounting capable of absorbing the shocks and vibrations to which the heating device and battery are subjected during operation of the vehicle. Accordingly, any possibility of such shocks and vibrations causing the adhesive to disengage either from the battery or the housing 16 is minimized, and damage to the heating device is prevented. It should also be noted that the tape 38 which extends entirely around the heating device defines a sealed area between the heating device and the battery wall for promoting a more efficient transfer of heat.

While the preferred embodiment of the present invention has been shown and described herein, it is obvious that many structural details may be changed without departing from the spirit and scope of the appended claims.

The invention is claimed as follows:

1. A heating device for attachment to a battery installed in a vehicle or the like comprising a housing including a side plate having a central portion and a peripheral portion encircling said central portion, said housing including a cover member over said central portion, an electrical heating element mounted within said cover member adjacent said central portion and connectable with a source of electrical power, said central portion having an outer surface facing in a first direction, said peripheral portion having a surface facing generally in said first direction and offset a predetermined distance transversely from said central portion surface in a direction opposite from said first direction, resilient adhesive means secured to said peripheral portion for connecting said device to a battery, said adhesive means including a resilient body secured to said peripheral portion surface around said central portion surface and having a thickness slightly greater than said predetermined distance, said resilient body having an outer surface facing generally in said first direction, and a coating of adhesive material on said surface of the resilient body, said surface of the resilient body being offset slightly in said first direction from said central portion surface for engagement with the battery to be heated and slightly spacing said central portion surface from the battery.

2. A heating device, as defined in claim 1, wherein said resilient body substantially continuously covers the peripheral portion entirely around said central portion for substantially completely enclosing the space between said central portion surface and a battery when the heating device is applied to a battery.

3. A heating device for attachment to a battery installed in a vehicle or the like comprising housing means including a side plate having a central portion and a peripheral portion encircling said central portion, an electrical heating element mounted within said housing means adjacent said central portion and connectable with a source of electrical power, said central portion having an outer surface facing in a first direction, said peripheral portion having a surface facing generally in said first direction, resilient adhesive means secured to said peripheral portion for connecting said device to a battery, said central portion surface being substantially entirely exposed and free of said adhesive means, said adhesive means including a resilient body secured substantially only to said peripheral portion surface around said central portion and having a substantial thickness in said first direction, said resilient body having an outer surface facing generally in said first direction, and a coating of adhesive material on said outer surface of the resilient body, said surface of the resilient body being offset in said first direction from said central portion surface for engagement with the battery to be heated and for spacing the central portion surface from the battery.

4. A heating device, as defined in claim 3, wherein said resilient body extends substantially continuously around said central portion for substantially completely enclosing a space between said central portion surface and a battery when the heating device is applied to the battery.

References Cited in the file of this patent

UNITED STATES PATENTS

| | | |
|---|---|---|
| 1,869,629 | Stranszky | Aug. 2, 1932 |
| 2,404,736 | Marick | July 23, 1946 |
| 2,418,557 | Reiser | Apr. 8, 1947 |
| 2,570,376 | Quist | Oct. 9, 1951 |
| 2,596,567 | Lang | May 13, 1952 |
| 2,626,971 | Mansoff | Jan. 27, 1953 |
| 2,643,320 | Pfenninger | June 23, 1953 |
| 2,838,421 | Sohl | June 10, 1958 |
| 2,979,595 | Deacon | Apr. 11, 1961 |
| 3,004,130 | Miller | Oct. 10, 1961 |
| 3,014,829 | Curtin | Dec. 26, 1961 |
| 3,029,303 | Severino | Apr. 10, 1962 |
| 3,108,596 | Veach | Oct. 29, 1963 |